United States Patent
Huang et al.

(10) Patent No.: US 10,706,593 B2
(45) Date of Patent: Jul. 7, 2020

(54) METHOD AND SYSTEM FOR IMAGE RECONSTRUCTION USING TARGET ATTRIBUTE ASSISTED COMPRESSIVE SENSING

(71) Applicant: SHENZHEN UNIVERSITY, Shenzhen, Guangdong (CN)

(72) Inventors: Jianjun Huang, Guangdong (CN); Runqing Liang, Guangdong (CN); Li Kang, Guangdong (CN); Zhongyin Liang, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 119 days.

(21) Appl. No.: 16/120,461

(22) Filed: Sep. 4, 2018

(65) Prior Publication Data
US 2018/0374243 A1 Dec. 27, 2018

Related U.S. Application Data

(63) Continuation of application No. PCT/CN2016/094219, filed on Aug. 9, 2016.

(51) Int. Cl.
| | |
|---|---|
| *G06T 11/00* | (2006.01) |
| *H04N 19/94* | (2014.01) |
| *G06K 9/62* | (2006.01) |
| *G06K 9/20* | (2006.01) |

(52) U.S. Cl.
CPC .......... *G06T 11/005* (2013.01); *G06K 9/624* (2013.01); *G06T 11/006* (2013.01); *H04N 19/94* (2014.11); *G06K 9/20* (2013.01); *G06T 2211/424* (2013.01)

(58) Field of Classification Search
None
See application file for complete search history.

(56) References Cited

U.S. PATENT DOCUMENTS

| | | | | |
|---|---|---|---|---|
| 2013/0002715 | A1* | 1/2013 | Tidman | H04N 19/97 345/629 |
| 2014/0037199 | A1* | 2/2014 | Aharon | H04N 19/97 382/159 |

(Continued)

OTHER PUBLICATIONS

Tiwari, V.—"Designing sparse sensing matrix for compressive sensing to reconstruct high resolution medical images"—Cogent Engineering 2015—pp. 1-13 (Year: 2015).*

(Continued)

*Primary Examiner* — Bernard Krasnic

(57) ABSTRACT

The present invention provides a method for image reconstruction using target attribute assisted compressive sensing, including an initializing step, a subspace partitioning step, an atom set updating step, a sparse coefficient updating step and an outputting step. The present invention further provides a system for image reconstruction using target attribute assisted compressive sensing. A technical scheme provided by the present invention will introduce auxiliary information capable of reflecting target features into subspace partitioning in a case of unknown sparseness of a small target image signal, thereby accurately and effectively selecting the most closely matching dictionary subspace, and realizing efficient and rapid reconstruction of the small target image signal.

2 Claims, 3 Drawing Sheets

(56) References Cited

U.S. PATENT DOCUMENTS

2016/0043884 A1* 2/2016 Sandell ............... G06T 5/002
                                                     348/241
2017/0154413 A1* 6/2017 Yu ..................... G06K 9/6223

OTHER PUBLICATIONS

Bartuschat, D.—"An Orthogonal Matching Pursuit Algorithm for Image Denoising on the Cell Broadband Engine"—Parallel Processing and Applied Mathematics PPAM—2010—pp. 557-566 (Year: 2010).*

Pope, G.—"Compressive sensing a summary of reconstruction algorithms"—ETH Library 2009—pp. 1-130 (Year: 2009).*

* cited by examiner

METHOD AND SYSTEM FOR IMAGE RECONSTRUCTION USING TARGET ATTRIBUTE ASSISTED COMPRESSIVE SENSING

CROSS REFERENCE TO RELATED APPLICATIONS

The present application is a Continuation Application of PCT Application No. PCT/CN2016/094219 filed on Aug. 9, 2016. All the above are hereby incorporated by reference.

TECHNICAL FIELD

The present invention relates to the field of image compressive sensing, and particularly to a method and a system for reconstructing image from its compressive sensed version by target attribute assisted compressive sensing.

BACKGROUND

Compressive sensing technology is widely applied in the field of image processing due to the expected balance of a compression ratio and a reconstruction quality, and has become a frontier and a hot one in the field of signal processing since its inception. Since there are redundancies in natural image signals, such as spatial redundancy caused by the correlation between adjacent pixels, time redundancy caused by the correlation between different frames, and spectral redundancy caused by the correlation of different color planes or spectrum bands, image signals can be compressed and reconstructed by employing the compressive sensing technology. However, existing reconstruction algorithms do not achieve a good balance between the reconstruction quality and the reconstruction speed, and they often focus on the reconstruction quality but not the reconstruction time. In such case, fixed subspace reconstruction algorithms have been proposed.

Subspace OMP algorithms are widely applied in practical engineering projects due to its simple structure, easy implementation, and low computation burden compared with other types of algorithms. These algorithms include OMP, StOMP, ROMP, CoSaMP, and SP algorithms. The size of the subspace in the OMP algorithm is 1, so that large number of iterations, heavy computation burden and low reconstruction speed will be caused when the sparsity K is too large. The StOMP algorithm can select multiple matching atoms in one iterative process, so that it can effectively reduce the number of iterations, further decrease the computation burden and reduce the reconstruction time. However, it strongly depends on the sparsity, resulting that a signal may not be correctly reconstructed if the sparsity K is not correctly estimated. The ROMP algorithm selects the atoms twice according to a correlation principle and a regularization process, however, the subspace selection in this algorithm depends not only on an intra-value correlation, but excessively depends on the sparsity K. Whether or not K is correctly estimated will affect the convergence speed and the reconstruction effect of the algorithm. The CoSaMP algorithm selects multiple uncorrelated atoms from an atom dictionary by means of backtracking and removes some uncorrelated atoms, and multiple matching atoms may be selected in one iteration. It is also necessary to know the sparsity K, however the real signal sparsity K is often unknown, and different principles on which the addition or removal of the atoms during each iteration of the CoSaMP algorithm are based will possibly result in incorrect estimation of the support set. The SP algorithm is a compromise of the above algorithms, and its performance is optimal among the above algorithms. The SP algorithm is low in computational complexity and high in reconstruction precision, and has a strict theoretical guarantee that when a measurement matrix A meets a restricted isometry property, the SP algorithm can accurately reconstruct any K-sparse signal from its noiseless measurements. But it has similar advantages and disadvantages with the CoSaMP algorithm.

All of the above algorithms adopt the concept of a fixed subspace. Except that the size of the subspace of the OMP algorithm is 1, sizes of other subspaces are all larger than 1, these algorithms make the number of iterations be reduced due to selection of multiple matching atoms at one time, thereby reducing the computation burden and the reconstruction time. However, they still fail to meet the real-time requirements, and the above algorithms are heavily dependent on the sparsity K, and whether or not K is correctly estimated will determine whether the signal can be correctly estimated or not as well as determine the reconstruction time of the signal. Meanwhile, selection of the dictionary subspace in these algorithms is based on the intra-value correlation, but does not take natural characteristic attributes of the image signal into account.

SUMMARY

In view of the above, it is an object of the present invention to provide a method and a system for image reconstruction using target attribute assisted compressive sensing, which are intended to solve a problem of how to remedy defects such as lower reconstruction speed, lower reconstruction precision, and excessive dependence on sparsity in subspace OMP algorithms by means of target characteristic attributes (such as target size apriority, cohesion, and spatial sparsity, etc.) in a case where the sparsity of a small target image signal is unknown in the prior art.

The present invention provides a method for image reconstruction using target attribute assisted compressive sensing, including:

an initialization step: initializing these parameters such as a residual vector $r_{t-1}$, an atom set A and a number of iterations t, where $r_{t-1}$ is initialized to an input compressive measurement vector y, A is initialized to an empty set, and t is initialized to 1;

a subspace partitioning step: generating a sequence matrix $D \in R^{w \times h}$ consistent with a size of an image having a width of w and a height of h; storing numbers of 1 to w×h in the sequence matrix D and partitioning the sequence matrix D into a number of two-dimensional sub-blocks according to a preset size of a target and converting each of the partitioned sub-blocks in the sequence matrix D into a column vector in a column-stacking manner; and selecting corresponding vectors from a dictionary space $\Phi$ with elements in each column-stacked vector as indices to form a dictionary subspace $\Phi_i$, i=1, 2, ..., k, so as to realize the partitioning of the dictionary space;

an atom set updating step: computing a projection $$P_i = \frac{\Phi_i^T r_{t-1}}{\|\Phi_i\|_2^2}$$

of the residual vector $r_{t-1}$ on each of the partitioned dictionary subspaces $\Phi_i$ and calculating an energy $E_i = \|P_i\|_2^2$, i=1, 2, ... k of the projection; and then finding an index subscript $\lambda_t=\arg\max_{i=1}^{k} E_i$, which corresponds to a maximum energy of the projection, finding a corresponding dictionary subspace $\Phi_{\lambda_t}$ according to the obtained index subscript $\lambda_t$, updating the atom set to $A_t=[A_{t-1}, \Phi_{\lambda_t}]$, where $A_t$ is the currently updated atom set and $A_{t-1}$ is the last iteratively updated atom set; and after the atom set $A_t$ is updated, setting the dictionary subspace $\Phi_{\lambda_t}$ corresponding to $\lambda_t$ to 0 for ensuring that its value will not be repeatedly taken;

a sparse coefficient updating step: performing a least square estimation on sparse coefficients by utilizing the current iteratively updated atom set $A_t$, setting a sparse coefficient component $x_t=(A_t^T A_t)^{-1} A_t^T y$ of a signal on the atom set $A_t$, and updating the residual vector $r_t=y-Ax_t$; and an outputting step: performing an iteration termination determination according to the obtained updated residual vector $r_t$, and when a norm of the residual vector $r_t$ is greater than a preset constant $\varepsilon$, jumping to the atom set updating step for performing a next iteration, otherwise terminating the iteration and outputting a final estimated value of the sparse coefficient of the signal.

Preferably, the subspace partitioning step specifically includes:

setting a size of a template to a×b, it is assumed that a size of the target is B=a×b, and generating a two-dimensional sequence matrix $D \in R^{w \times h}$ corresponding to the size of the image, where a and b are a priori width and a priori height of the target, respectively, and w and h are a width and a height of a small target image, respectively, w is divisible by a, and h is divisible by b;

using elements in the two-dimensional sequence matrix D as column-stacking values corresponding to positions of pixels in the image, and partitioning the two-dimensional sequence matrix D according to a priori size of the target to obtain $D=\{B_1, B_2, \ldots, B_i, \ldots B_k\}$, where $$k = \frac{h}{b} \times \frac{w}{a};$$

setting the size of the template to a value which is capable of completely covering the target and may divide the width and the height of the image without remainder when the width w of the image is not divisible by the priori width of the target a and/or the image height h is not divisible by the priori height of the target b; and converting each of the partitioned sub-blocks in the sequence matrix D into a column vector in the column-stacking manner, and selecting corresponding vectors from a dictionary subspace $\Phi$ with elements in each column-stacked vector as indices to form a dictionary subspace $\Phi_i$, i=1, 2, ..., k, that is, partitioning the dictionary subspace, $\Phi_i=\Phi(\text{Vec}(B_i))$, i=1, 2, ..., k.

In another aspect, the present invention further provides a system for image reconstruction using target attribute assisted compressive sensing, including:

an initialization module, which is configured to initialize these parameters such as a residual vector $r_{t-1}$, an atom set A and a number of iterations t, where $r_{t-1}$ is initialized to an input compressive measurement vector y, A is initialized to an empty set, and t is initialized to 1;

a subspace partitioning module, which is configured to generate a sequence matrix $D \in R^{w \times h}$ consistent with a size of an image having a width of w and a height of h; store numbers of 1 to w×h in the sequence matrix D, and partition the sequence matrix D into a number of two-dimensional sub-blocks according to a preset size of a target and convert each of the partitioned sub-blocks in the sequence matrix D into a column vector in a column-stacking manner; and select corresponding vectors from a dictionary space $\Phi$ with elements in each column-stacked vector as indices to form a dictionary subspace $\Phi_i$, i=1, 2, ..., k, so as to realize the partitioning of the dictionary space;

an atom set updating module, which is configured to compute a projection $$P_i = \frac{\Phi_i^T r_{t-1}}{\|\Phi_i\|_2^2}$$

of the residual vector $r_{t-1}$ on each of the partitioned dictionary subspaces and calculate an energy $E_i=\|P_i\|_2^2$, i=1, 2, ... k of the projection; and then find an index subscript $\lambda_t=\arg\max_{i=1}^{k} E_i$, which corresponds to a maximum energy of the projection, find a corresponding dictionary subspace $\Phi_{\lambda_t}$ according to the obtained index subscript $\lambda_t$, update the atom set to $A_t=[A_{t-1}, \Phi_{\lambda_t}]$, where $A_t$ is the currently updated atom set and $A_{t-1}$ is the last iteratively updated atom set; and after the atom set $A_t$ is updated, set the dictionary subspace $\Phi_{\lambda_t}$ corresponding to $\lambda_t$ to 0 for ensuring that its value will not be repeatedly taken;

a sparse coefficient updating module, which is configured to perform a least square estimation on sparse coefficients by utilizing the current iteratively updated atom set $A_t$, set a sparse coefficient component $x_t=(A_t^T A_t)^{-1} A_t^T y$ of a signal on the atom set $A_t$, and update the residual vector $r_t=y-Ax_t$; and an outputting module, which is configured to perform an iteration termination determination according to the obtained updated residual vector $r_t$, and when a norm of the residual vector $r_t$ is greater than a preset constant $\varepsilon$, jump to the atom set updating step for performing a next iteration, otherwise terminate the iteration and output a final estimated value of the sparse coefficient of the signal.

Preferably, the subspace partitioning module is specifically configured to:

set a size of a template to a×b, it is assumed that a size of the target is B=a×b, and generate a two-dimensional sequence matrix $D \in R^{w \times h}$ corresponding to the size of the image, where a and b are a priori width and a priori height of the target, respectively, and w and h are a width and a height of a small target image, respectively, w is divisible by a, and h is divisible by b;

use elements in the two-dimensional sequence matrix D as column-stacking values corresponding to positions of pixels in the image, and partition the two-dimensional sequence matrix D according to a priori size of the target to obtain $D=\{B_1, B_2, \ldots, B_i, \ldots B_k\}$, where $$k = \frac{h}{b} \times \frac{w}{a};$$

set the size of the template to a value which is capable of completely covering the target and may divide the width and the height of the image without remainder when the width w of the image is not divisible by the priori width of the target a and/or the image height h is not divisible by the priori height of the target b; and convert each of the partitioned sub-blocks in the sequence matrix D into a column vector in the column-stacking manner, and select corresponding vectors from a dictionary subspace $\Phi$ with elements in each column-stacked vector as indices to form a dictionary subspace $\Phi_i$, i=1, 2, ..., k, that is, partition the dictionary subspace, $\Phi_i=\Phi(\text{Vec}(B_i))$, i=1, 2, ..., k.

The technical scheme provided by the present invention introduces auxiliary information reflecting target characteristics into the partitioning of subspace in a case where the sparsity of a small target image signal is unknown, thereby accurately and effectively selecting the most closely matching dictionary subspace, and realizing efficient and rapid reconstruction of the small target image signal. Compared with the prior art, the present invention has the advantages that: (1) the present invention relies on neither the sparsity of the signal nor the intra-value correlation to select the dictionary subspace; (2) the present invention can effectively realize the reconstruction of the target and improve the reconstruction quality; and (3) the present invention can effectively reduce the number of iterations and decrease the computation burden, thereby greatly increasing the reconstruction speed.

DESCRIPTION OF THE EMBODIMENTS

In order to make objects, technical schemes and advantages of the present invention be more clearly understood, the present invention will be further described in details with reference to accompanying drawings and embodiments. It should be understood that the specific embodiments described herein are merely illustrative of the present invention and are not intended to limit the present invention.

In order to solve the problems in the prior art, the present invention proposes a concept as follows: when an image is reconstructed, partitioning image space to subspaces and further reconstructing the image will be assisted by means of target attributes. With respect to the problem of selecting the subspace in accordance with the sparsity and according to the intra-value correlation in existing fixed subspace OMP algorithms, the present invention proposes that a dictionary subspace is partitioned according to a size of a target, which effectively reduces the number of iterations, and improves the reconstruction quality without depending on the sparsity. A specific method for reconstructing the image according to the present invention includes the following steps: firstly, generating a sequence matrix consistent with a size of the image, partitioning the sequence matrix into sub-blocks according to a priori size of the target, converting each of the partitioned sub-blocks into column vectors in a column-stacking manner, selecting a dictionary subspace with elements in each column vector as an index set, namely, partitioning the subspace; and after the subspace is partitioned, computing a projection of a residual vector on each subspace by means of a certain correlation principle and finding a dictionary subspace corresponding to the maximum projection energy, and expanding the atom set with the dictionary subspace and further estimating a signal and the residual vector.

The method for image reconstruction using target attribute assisted compressive sensing provided by the present invention has the advantage that a small target image signal can be reconstructed efficiently and quickly without depending on the sparsity of the signal; and the data volume, the storage cost and the transmission bandwidth may be greatly reduced in practical application, and the time may also be saved.

A detailed description of the method for image reconstruction using target attribute assisted compressive sensing provided by the present invention will be presented below.

Figure 1:
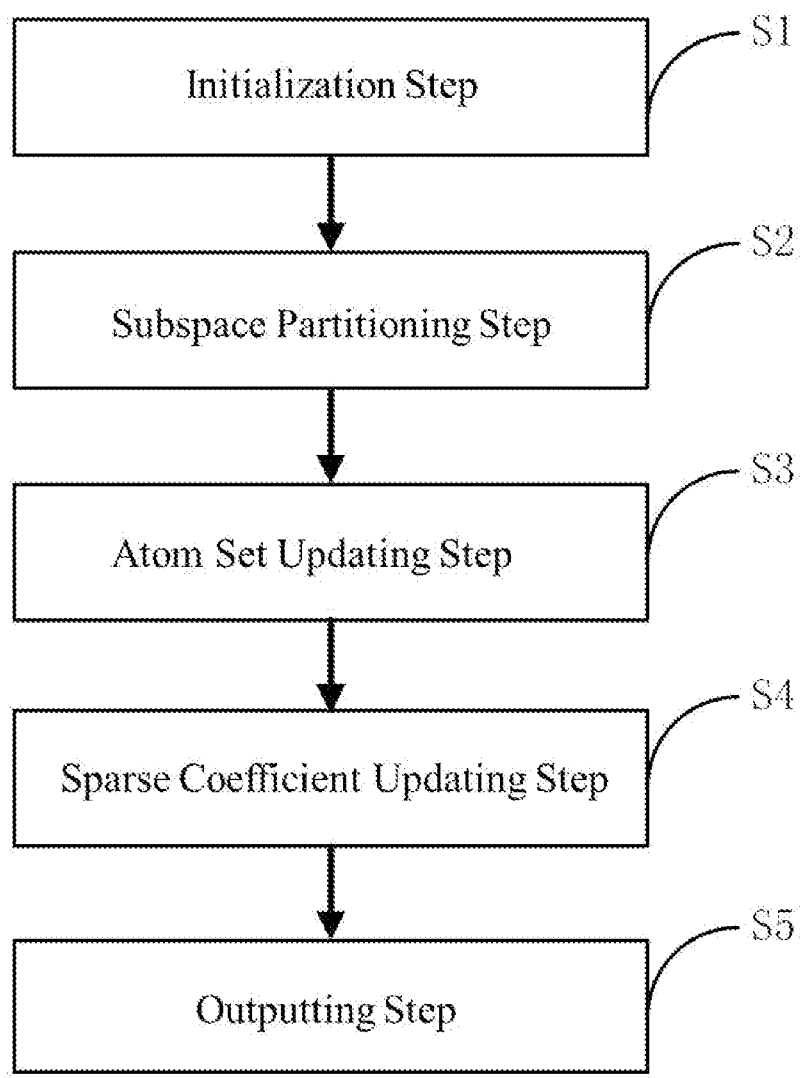
FIG. 1 is a flow diagram of a method for image reconstruction using target attribute assisted compressive sensing in an embodiment of the present invention.
Figure 2:
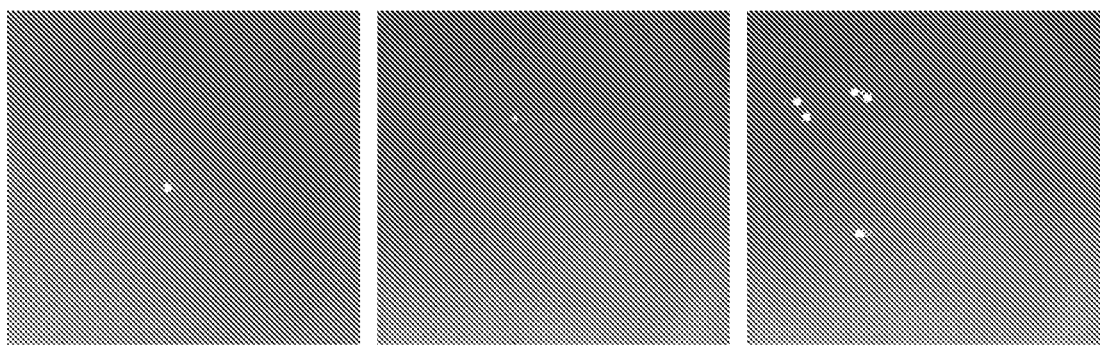
FIG. 2 is infrared small object images with single target, double targets, or multiple targets inside according to an embodiment of the present invention, which are acquired from different scenes by using a cooled thermal infrared imager with a model of IR300 and a frame frequency of 50 frames.

With reference to FIG. 1, there is shown a flow diagram of the method for image reconstruction using target attribute assisted compressive sensing in an embodiment of the present invention.

In a step S1, namely, an initialization step, initializing these parameters such as a residual vector $r_{t-1}$, an atom set A and a number of iterations t, where $r_{t-1}$ is initialized to an input compressive measurement vector y, A is initialized to an empty set, and t is initialized to 1.

In a step S2, namely, a subspace partitioning step, generating a sequence matrix $D \in R^{w \times h}$ consistent with a size of an image having a width of w and a height of h; storing numbers of 1 to w×h in the sequence matrix D, and partitioning the sequence matrix D into a number of two-dimensional sub-blocks according to a preset size of a target and converting each of the partitioned sub-blocks in the sequence matrix D into a column vector in a column-stacking manner; and selecting corresponding vectors from a dictionary space $\Phi$ with elements in each column-stacked vector as indices to form a dictionary subspace $\Phi_i$, i=1, 2, ..., k, so as to realize the partitioning of the dictionary space.

In this embodiment, the subspace partitioning step S2 specifically includes:

setting a size of a template to a×b, it is assumed that a size of the target is B=a×b, and generating a two-dimensional sequence matrix $D \in R^{w \times h}$ corresponding to the size of the image, where a and b are a priori width and a priori height of the target, respectively, and w and h are a width and a height of a small target image, respectively, w is divisible by a, and h is divisible by b;

using elements in the two-dimensional sequence matrix D as column-stacking values corresponding to positions of pixels in the image, and partitioning the two-dimensional sequence matrix D according to a priori size of the target to obtain $D=\{B_1, B_2, \ldots, B_i, \ldots B_k\}$, where $$k = \frac{h}{b} \times \frac{w}{a};$$

setting the size of the template to a value which is capable of completely covering the target and may divide the width and the height of the image without remainder when the width w of the image is not divisible by the priori width of the target a and/or the image height h is not divisible by the priori height of the target b; and converting each of the partitioned sub-blocks in the sequence matrix D into a column vector in the column-stacking manner, and selecting corresponding vectors from a dictionary subspace Φ with elements in each column-stacked vector as indices to form a dictionary subspace $Φ_i$ (i=1, 2, ..., k), that is, partitioning the dictionary subspace, $Φ_i=Φ(\text{Vec}(B_i))$, i=1, 2, ..., k.

In a step S3, namely, an atom set updating step, computing a projection $$P_i = \frac{Φ_i^T r_{t-1}}{\|Φ_i\|_2^2}$$

of the residual vector $r_{t-1}$ on each of the partitioned dictionary subspaces $Φ_i$ and calculating an energy $E_i = \|P_i\|_2^2$, i=1, 2,...k of the projection; and then finding an index subscript $λ_t = \arg\max_{i=1}^{k} E_i$, which corresponds to a maximum energy of the projection, finding a corresponding dictionary subspace $Φ_{λ_t}$ according to the obtained index subscript $λ_t$, updating the atom set to $A_t=[A_{t-1}, Φ_{λ_t}]$, where $A_t$ is the currently updated atom set and $A_{t-1}$ is the last iteratively updated atom set; and after the atom set $A_t$ is updated, setting the dictionary subspace $Φ_{λ_t}$ corresponding to $λ_t$ to 0 for ensuring that its value will not be repeatedly taken.

In a step S4, namely, a sparse coefficient updating step, performing a least square estimation on sparse coefficients by utilizing the current iteratively updated atom set $A_t$, setting a sparse coefficient component $x_t=(A_t^T A_t)^{-1} A_t^T y$ of a signal on the atom set $A_t$, and updating the residual vector $r_t = y - Ax_t$.

In a step S5, namely, an outputting step, performing an iteration termination determination according to the obtained updated residual vector $r_t$, and when a norm of the residual vector $r_t$ is greater than a preset constant ε, jumping to the atom set updating step for performing a next iteration, otherwise terminating the iteration and outputting a final estimated value of the sparse coefficient of the signal.

The following will be used to verify the efficiency and rapidity of reconstructing the image signal in the method of the present invention. An experiment is performed on infrared small object images with single target, double targets, or multiple targets inside in the present invention, which are acquired from different scenes. The reconstruction quality is measured by a more objective peak signal to noise ratio, and the rapidity of the algorithm is measured by the reconstruction time.

The experiment of the present invention is configured to specifically include a two-dimensional sequence matrix $D \in R^{w \times h}$, a size w×h, w=240, h=320 of an image; a length N=w×h=76800 of the column-stacked image vector; a compressive measurement dimension M=19200, a compression ratio $$r = \frac{M}{N} = 0.25,$$

a sensing matrix (a random vector following the Gaussian distribution) $Φ \in R^{M \times N}$; a compressive measurement $y \in R^{M \times 1}$; and a size B=a×b=4×4 (w is divisible by a, h is divisible by b) of a target.

Firstly, the two-dimensional sequence matrix D is partitioned according to the priori size of the target to obtain $D=\{B_1, B_2, ..., B_i, ... B_k\}$, where $$k = \frac{h}{b} \times \frac{w}{a} = 4800,$$

then the corresponding subspace is partitioned into $Φ_i=Φ(\text{Vec}(B_i))$, i=1, 2, ..., k. A projection $P_i$ of a residual vector in each subspace is calculated and an energy $E_i$ of the $P_i$ is computed, and an index subscript $λ_t$, which corresponds to a maximum energy of the projection on subspace is found. The corresponding dictionary subspace $Φ_{λ_t}$, that is, a subspace strongly correlated with the residual vector, is found according to the index subscript $λ_t$, and the atom set $A_t=[A_{t-1}, Φ_{λ_t}]$ is updated with this subspace. In this experiment, c=a×b=16 dictionary atoms are expanded by means of one iteration, that is, 16 sparse coefficients may be restored by a single iteration cycle. It is noted that after the atom set A is updated every time, the dictionary subspace $Φ_{λ_t}$ corresponding to $λ_t$ is set to 0 to ensure that its value will not be repeatedly taken.

Figure 3:
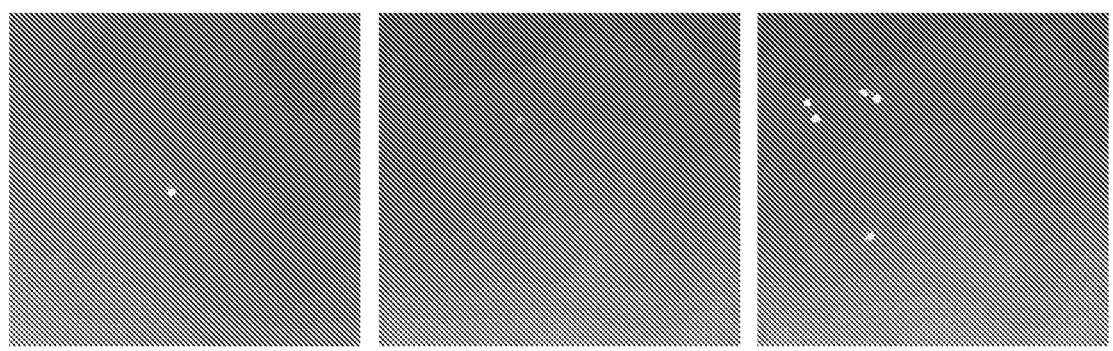
FIG. 3 is a diagram showing the reconstruction results of several infrared small target images according to experimental conditions in an embodiment of the present invention.

According to the above experiment conditions, reconstruction results of several infrared small target images in the present invention are shown in FIG. 3.

The above experiment is only illustrative of a reconstruction result of one experiment under a single compression ratio. In order to avoid the influence caused by contingency and to more objectively illustrate the effectiveness of the present invention for image reconstruction, 100 infrared small target images under the same scene will be reconstructed, and the average peak signal to noise ratio(PSNR) of the images reconstructed by the present invention under different compression ratios is evaluated. The average peak signal to noise ratio of the present invention is shown in Table 1.

TABLE 1

Average Peak Signal to Noise Ratio of the Images Reconstructed by the Method of the Present Invention.

| Compression Ratio | PSNR of Image with Single Infrared Small Target | PSNR of Image with Two Infrared Small Targets | PSNR of Image with Multiple Infrared Small Targets |
|---|---|---|---|
| 0.3 | 47.2525 dB | 62.9696 dB | 45.6242 dB |
| 0.4 | 47.2565 dB | 62.9746 dB | 45.6400 dB |
| 0.5 | 47.2578 dB | 62.9774 dB | 45.6522 dB |

It is concluded from FIG. 3 and Table 1 that the present invention can realize the reconstruction of the infrared small target images under different scenes, and is relatively high in the reconstructed image peak signal to noise ratio, which fully illustrate the effectiveness and the accuracy of the present invention.

The present invention mainly solves the problem of long reconstruction time of fixed subspace algorithms. Therefore, as shown in Table 2, the average time of reconstructing the infrared images under different scenes by the present invention under different compression ratios will be calculated experimentally herein.

TABLE 2

Reconstruction Time of the Method of the Present Invention (Unit: Second)

| Compression Ratio | Image with Single Infrared Small Target | Image with Two Infrared Small Targets | Image with Multiple Infrared Small Targets |
|---|---|---|---|
| 5/192 | 0.1340 | 0.1795 | 1.8433 |
| 10/192 | 0.1694 | 0.2090 | 3.2495 |
| 15/192 | 0.1978 | 0.2472 | 4.4303 |
| 0.3 | 0.4527 | 0.6940 | 14.7434 |
| 0.4 | 0.5770 | 0.8681 | 19.520 |

It can be concluded from Table 2 that firstly, the present invention can reconstruct the infrared small target images under different scenes accurately even when the compression ratio is relatively low; and secondly, the present invention is less in time of reconstructing the infrared small target images. The above conclusions fully illustrate the rapidity of the present invention.

The method for image reconstruction using target attribute assisted compressive sensing provided by the present invention introduces auxiliary information reflecting target characteristics into the partitioning of subspace in a case where the sparsity of a small target image signal is unknown, thereby accurately and effectively selecting the most closely matching dictionary subspace, and realizing efficient and rapid reconstruction of the small target image signal. Compared with the prior art, the present invention has the advantages that: (1) the present invention relies on neither the sparsity of the signal nor the intra-value correlation to select the dictionary subspace; (2) the present invention can effectively realize the reconstruction of the target with good reconstruction quality; and (3) the present invention can effectively reduce the number of iterations and decrease the computation burden, thereby greatly increasing the reconstruction speed.

Specific embodiments of the present invention further provide a system 10 for image reconstruction using target attribute assisted compressive sensing, mainly including:

an initialization module 11, which is configured to initialize these parameters such as a residual vector $r_{t-1}$, an atom set A and a number of iterations t, where $r_{t-1}$ is initialized to an input compressive measurement vector y, A is initialized to an empty set, and t is initialized to 1;

a subspace partitioning module 12, which is configured to generate a sequence matrix $D \in R^{w \times h}$ consistent with a size of an image having a width of w and a height of h; store numbers of 1 to w×h in the sequence matrix D, and partition the sequence matrix D into a number of two-dimensional sub-blocks according to a preset size of a target and convert each of the partitioned sub-blocks in the sequence matrix D into a column vector in a column-stacking manner; and select corresponding vectors from a dictionary space $\Phi$ with elements in each column-stacked vector as indices to form a dictionary subspace $\Phi_i$, i=1, 2, . . . , k, so as to realize the partitioning of the dictionary space;

an atom set updating module 13, which is configured to compute a projection $$P_i = \frac{\Phi_i^T r_{t-1}}{\|\Phi_i\|_2^2}$$

of the residual vector $r_{t-1}$ on each of the partitioned dictionary subspaces $\Phi_i$ and calculate an energy $E_i = \|P_i\|_2^2$, i=1, 2, . . . k of the projection; and then find an index subscript $\lambda_t = \arg \max_{i=1}^{k} E_i$, which corresponds to the maximum energy of the projection, find a corresponding dictionary subspace $\Phi_{\lambda_t}$ according to the obtained index subscript $\lambda_t$, update the atom set to $A_t = [A_{t-1}, \Phi_{\lambda_t}]$, where $A_t$ is the currently updated atom set and $A_{t-1}$ is the last iteratively updated atom set; and after the atom set $A_t$ is updated every time, set the dictionary subspace $\Phi_{\lambda_t}$ corresponding to $\lambda_t$ to 0 for ensuring that its value will not be repeatedly taken;

a sparse coefficient updating module 14, which is configured to perform a least square estimation on sparse coefficients by utilizing the current iteratively updated atom set $A_t$, set a sparse coefficient component $x_t = (A_t^T A_t)^{-1} A_t^T y$ of a signal on the atom set $A_t$, and update the residual vector, $r_t = y - A x_t$; and an outputting module 15, which is configured to perform an iteration termination determination according to the obtained updated residual vector $r_t$, and when a norm of the residual vector $r_t$ is greater than a preset constant ε, jump to the atom set updating step for performing a next iteration, otherwise terminate the iteration and output a final estimated value of the sparse coefficient of the signal.

The present invention further provides a system 10 for image reconstruction using target attribute assisted compressive sensing, which will introduce auxiliary information capable of reflecting target features into subspace partitioning in a case of unknown sparseness of a small target image signal, thereby accurately and effectively selecting the most closely matching dictionary subspace, and realizing efficient and rapid reconstruction of the small target image signal.

Figure 4:
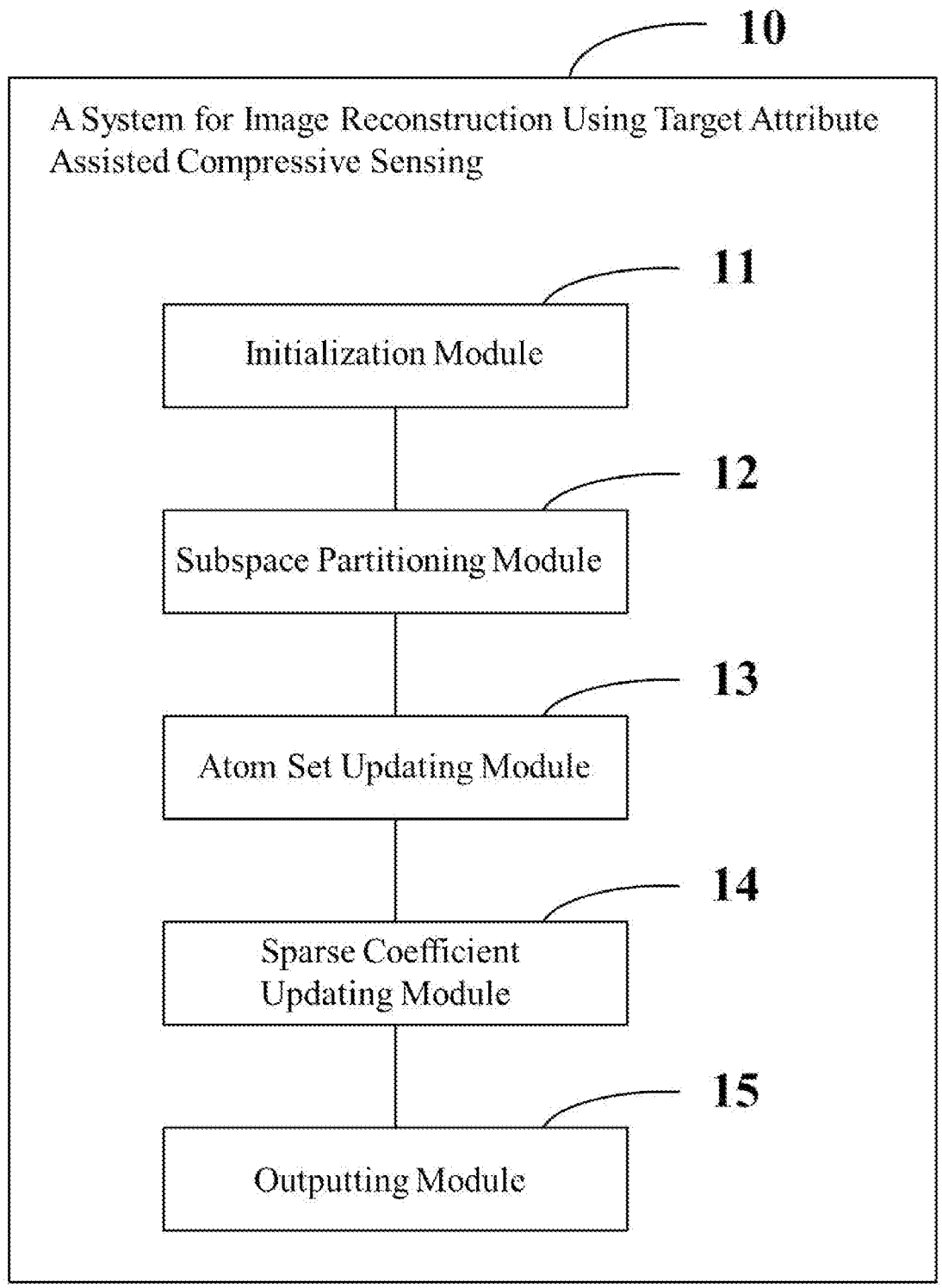
FIG. 4 is a schematic diagram showing an internal structure of a system 10 for image reconstruction using target attribute assisted compressive sensing in an embodiment of the present invention.

With reference to FIG. 4, there is shown a schematic structural diagram of a system 10 for image reconstruction using target attribute assisted compressive sensing according to an embodiment of the present invention.

In this embodiment, the system 10 for image reconstruction using target attribute assisted compressive sensing mainly includes an initialization module 11, a subspace partitioning module 12, an atom set updating module 13, a sparse coefficient updating module 14 and an outputting module 15.

The initialization module 11 is configured to initialize these parameters such as a redundant vector $r_{t-1}$, an atom set A and a number of iterations t, where $r_{t-1}$ is initialized to an input compressive measurement vector y, A is initialized to an empty set, and t is initialized to 1.

The subspace partitioning module 12 is configured to generate a sequence matrix $D \in R^{w \times h}$ consistent with a size of an image having a width of w and a height of h; store numbers of 1 to w×h in the sequence matrix D, and partition the sequence matrix D into a number of two-dimensional sub-blocks according to a preset size of a target and convert each of the partitioned sub-blocks in the sequence matrix D into a column vector in a column-stacking manner; and select corresponding vectors from a dictionary space $\Phi$ with elements in each column-stacked vector as indices to form a dictionary subspace $\Phi_i$, i=1, 2, . . . , k, so as to realize the partitioning of the dictionary space.

In this embodiment, the subspace partitioning module 12 is specifically configured to:

set a size of a template to a×b, it is assumed that a size of the target is B=a×b, and generate a two-dimensional sequence matrix $D \in R^{w \times h}$ corresponding to the size of the image, where a and b are a priori width and a priori height of the target, respectively, and w and h are a width and a height of a small target image, respectively, w is divisible by a, and h is divisible by b;

use elements in the two-dimensional sequence matrix D as column-stacking values corresponding to positions of pixels in the image, and partition the two-dimensional sequence matrix D according to a priori size of the target to obtain D={B$_1$, B$_2$, ..., B$_i$, ... B$_k$}, where $$k = \frac{h}{b} \times \frac{w}{a};$$

set the size of the template to a value which is capable of completely covering the target and may divide the width and height of the image without remainder when the width w of the image is not divisible by the priori width of the target a and/or the image height h is not divisible by the priori height of the target b; and convert each of the partitioned sub-blocks in the sequence matrix D into a column vector in the column-stacking manner, and select corresponding vectors from a dictionary subspace Φ with elements in each column-stacked vector as indices to form a dictionary subspace Φ$_i$, i=1, 2, ..., k, that is, partition the dictionary subspace, Φ$_i$=Φ(Vec(B$_i$)), i=1, 2, ..., k.

$$P_i = \frac{\Phi_i^T r_{t-1}}{\|\Phi_i\|_2^2}$$

The atom set updating module 13 is configured to compute a projection of the residual vector r$_{t-1}$ on each of the partitioned dictionary subspaces Φ$_i$ and calculate an energy E$_i$=∥P$_i$∥$_2^2$, i=1, 2, ... k of the projection; and then find an index subscript λ$_t$=arg max$_{i=1}^{k}$ E$_i$, which corresponds to the maximum energy of the projection, find a corresponding dictionary subspace Φ$_{λ_t}$ according to the obtained index subscript λ$_t$, update the atom set to A$_t$=[A$_{t-1}$, Φ$_{λ_t}$], where A$_t$ is the currently updated atom set and A$_{t-1}$ is the last iteratively updated atom set; and after the atom set A$_t$ is updated, set the dictionary subspace Φ$_{λ_t}$ corresponding to λ$_t$ to 0 for ensuring that its value will not be repeatedly taken;

The sparse coefficient updating module 14 is configured to perform a least square estimation on sparse coefficients by utilizing the current iteratively updated atom set A$_t$, set a sparse coefficient component x$_t$=(A$_t^T$A$_t$)$^{-1}$A$_t^T$y of a signal on the atom set A$_t$, and update the residual vector, r$_t$=y−Ax$_t$.

The outputting module 15 is configured to perform an iteration termination determination according to the obtained updated residual vector r$_t$, and when a norm of the residual vector r$_t$ is greater than a preset constant ε, jump to the atom set updating step for performing a next iteration, otherwise terminate the iteration and output a final estimated value of the sparse coefficient of the signal.

The system 10 for image reconstruction using target attribute assisted compressive sensing provided by the present invention introduces auxiliary information reflecting target characteristics into the subspace partitioning in a case where the sparsity of a small target image signal is unknown, thereby accurately and effectively selecting the most closely matching dictionary subspace, and realizing efficient and rapid reconstruction of the small target image signal. Compared with the prior art, the present invention has the advantages that: (1) the present invention relies on neither the sparsity of the signal nor the intra-value correlation to select the dictionary subspace; (2) the present invention can effectively realize the reconstruction of the target and improve the reconstruction quality; and (3) the present invention can effectively reduce the number of iterations and decrease the computation burden, thereby greatly increasing the reconstruction speed.

The present invention has the advantage that a small target image signal can be reconstructed efficiently and quickly without depending on the sparsity of the signal; and the data volume, the storage cost and the transmission bandwidth can be greatly reduced in practical application, and the time can also be saved.

The present invention is widely applied and suitable for processing small target images in a plurality of application fields, such as infrared images in the military field, CT images in the medical field, and Mura images in the industrial production field.

It should be noted that in the above embodiments, the respective units included are divided only in accordance with a functional logic, but are not limited to the above-described division, as long as the corresponding functions can be realized. In addition, specific names of the functional units are easy to distinguish mutually, and are not intended to limit the protective scope of the present invention.

In addition, it will be understood by those ordinarily skilled in the art that realizing all or part of the steps of the embodiments described above may be accomplished by a program to instruct the associated hardware, and the respective program may be stored in a computer-readable storage medium, such as a ROM/RAM, a magnetic disk or an optical disk.

The foregoing is merely illustrative of the preferred embodiments of the present invention and is not intended to limit the present invention, and any modifications, equivalent substitutions and improvements made within the spirit and principles of the present invention are intended to be encompassed within the protective scope of the present invention.

What is claimed is:

1. A method for image reconstruction using target attribute assisted compressive sensing, comprising:
   an initialization step: initializing parameters comprising a residual vector r$_{t-1}$, an atom set A and a number of iterations t, where r$_{t-1}$ is initialized to an input compressive measurement vector y, A is initialized to an empty set, and t is initialized to 1;
   a subspace partitioning step: generating a sequence matrix D∈R$^{w \times h}$ consistent with a size of an image having a width of w and a height of h, wherein R is a set of real numbers, R$^{w \times h}$ is a two-dimensional real matrix with w rows and h columns; storing numbers of 1 to w×h in the sequence matrix D, and partitioning the sequence matrix D into a number of two-dimensional sub-blocks according to a preset size of a target and converting each of the partitioned sub-blocks in the sequence matrix D into a column vector in a column stacking manner; and selecting corresponding vectors from a dictionary space Φ with elements in each column-stacked vector as indices to form a dictionary subspace Φ$_i$, i=1, 2, ..., k, so as to realize the partitioning of the dictionary space;
   an atom set updating step: computing a projection $$P_i = \frac{\Phi_i^T r_{t-1}}{\|\Phi_i\|_2^2}$$

of the residual vector r$_{t-1}$ on each of the partitioned dictionary subspaces Φ$_i$ and calculating an energy $E_i=\|P_i\|_2^2$, i=1, 2, ... k of the projection, wherein T is a mathematical transpose function; and then finding an index subscript $\lambda_t=\mathrm{argmax}_{i=1}^{k} E_i$, which corresponds to a maximum energy of the projection, finding a corresponding dictionary subspace $\Phi_{\lambda_t}$ according to the obtained index subscript $\lambda_t$, updating the atom set to $A_t=[A_{t-1}, \Phi_{\lambda_t}]$, where $A_t$ is the currently updated atom set and $A_{t-1}$ is the last iteratively updated atom set; and after the atom set $A_t$ is updated every time, setting the dictionary subspace $\Phi_{\lambda_t}$ corresponding to $\lambda_t$ to 0 for ensuring that its value will not be repeatedly taken;

a sparse coefficient updating step: performing a least square estimation on sparse coefficients by utilizing the current iteratively updated atom set $A_t$, setting a sparse coefficient component $x_t=(A_t^T A_t)^{-1} A_t^T y$ of a signal on the atom set $A_t$, wherein T is a mathematical transpose function, and updating the residual vector $r_t=y-Ax_t$; and an outputting step: performing an iteration termination determination according to the obtained updated residual vector $r_t$, and when a norm of the residual vector $r_t$ is greater than a preset constant ε, jumping to the atom set updating step for performing a next iteration, otherwise terminating the iteration and outputting a final estimated value of the sparse coefficient of the signal;

wherein the subspace partitioning step specifically comprises:

setting a size of a template to a×b, it is assumed that a size of the target is B=a×b and generating a two-dimensional sequence matrix $D \in R^{w \times h}$ corresponding to the size of the image, where a and b are a priori width and a priori height of the target, respectively, and w and h are a width and a height of a small target image, respectively, w is divisible by a, and h is divisible by b;

using elements in the two-dimensional sequence matrix D as column-stacking values corresponding to positions of pixels in the image, and partitioning the two-dimensional sequence matrix D according to a priori size of the target to obtain D={$B_1, B_2, \ldots, B_i, \ldots B_k$}, where $$k = \frac{h}{b} \times \frac{w}{a};$$

setting the size of the template to a value which is capable of completely covering the target and may divide the width and the height of the image without remainder when the width w of the image is not divisible by the priori width of the target a and/or the image height h is not divisible by the priori height of the target b; and converting each of the partitioned sub-blocks in the sequence matrix D into a column vector in the column stacking manner, and selecting corresponding vectors from a dictionary subspace Φ with elements in each column-stacked vector as indices to form a dictionary subspace $\Phi_i$ (i=1, 2, ..., k), that is, partitioning the dictionary subspace, $\Phi_i=\Phi(\mathrm{Vec}(B_i))$, i=1, 2, ..., k.

2. A system for image reconstruction using target attribute assisted compressive sensing, comprising:

an initialization module, which is configured to initialize parameters comprising a residual vector $r_{t-1}$, an atom set A and a number of iterations t, where $r_{t-1}$ is initialized to an input compressive measurement vector y, A is initialized to an empty set, and t is initialized to 1;

a subspace partitioning module, which is configured to generate a sequence matrix $D \in R^{w \times h}$ consistent with a size of an image having a width of w and a height of h, wherein R is a set of real numbers, $R^{w \times h}$ is a two-dimensional real matrix with w rows and h columns; store numbers of 1 to w×h in the sequence matrix D, and partition the sequence matrix D into a number of two-dimensional sub-blocks according to a preset size of a target and convert each of the partitioned sub-blocks in the sequence matrix D into a column vector in a column stacking manner; and select corresponding vectors from a dictionary space Φ with elements in each column-stacked vector as indices to form a dictionary subspace $\Phi_i$, i=1, 2, ..., k, so as to realize the partitioning of the dictionary space;

an atom set updating module, which is configured to compute a projection $$P_i = \frac{\Phi_i^T r_{t-1}}{\|\Phi_i\|_2^2}$$

of the residual vector $r_{t-1}$ on each of the partitioned dictionary subspaces $\Phi_i$ and calculate an energy $E_i=\|P_i\|_2^2$, i=1, 2, ... k of the projection, wherein T is a mathematical transpose function; and then find an index subscript $\lambda_t=\mathrm{arg\,max}_{i=1}^{k} E_i$, which corresponds to a maximum energy of the projection, find a corresponding dictionary subspace $\Phi_{\lambda_t}$ according to the obtained index subscript $\lambda_t$, update the atom set to $A_t=[A_{t-1}, \Phi_{\lambda_t}]$, where $A_t$ is the currently updated atom set and $A_{t-1}$ is the last iteratively updated atom set; and after the atom set $A_t$ is updated every time, set the dictionary subspace $\Phi_{\lambda_t}$ corresponding to $\lambda_t$ to 0 for ensuring that its value will not be repeatedly taken;

a sparse coefficient updating module, which is configured to perform a least square estimation on sparse coefficients by utilizing the current iteratively updated atom set $A_t$, set the sparse coefficient $x_t=(A_t^T A_t)^{-1} A_t^T y$ of a signal on the atom set $A_t$, wherein T is a mathematical transpose function, and update the residual vector $r_t=y-Ax_t$; and an outputting module, which is configured to perform an iteration termination determination according to the obtained updated residual vector $r_t$, and when a norm of the residual vector $r_t$ is greater than a preset constant ε, jump to the atom set updating step for performing a next iteration, otherwise terminate the iteration and output a final estimated value of the sparse coefficient of the signal;

wherein the subspace partitioning module is specifically configured to:

set a size of a template to a×b, it is assumed that a size of the target is B=a×b, and generate a two-dimensional sequence matrix $D \in R^{w \times h}$ corresponding to the size of the image, where a and b are a priori width and a priori height of the target, respectively, and w and h are a width and a height of a small target image, respectively, w is divisible by a, and h is divisible by b, use elements in the two-dimensional sequence matrix D as column-stacking values corresponding to positions of pixels in the image, and partition the two-dimensional sequence matrix D according to a priori size of the target to obtain D={$B_1, B_2, \ldots, B_i, \ldots B_k$}, where $$k = \frac{h}{b} \times \frac{w}{a};$$

set the size of the template to a value which is capable of completely covering the target and may divide the width and height of the image without remainder when the width w of the image is not divisible by the priori width of the target a and/or the image height h is not divisible by the priori height of the target b; and convert each of the partitioned sub-blocks in the sequence matrix D into a column vector in a column stacking manner, and select corresponding vectors from a dictionary subspace $\Phi$ with elements in each column-stacked vector as indices to form a dictionary subspace $\Phi_i$, i=1, 2, . . . , k, that is, partition the dictionary subspace, $\Phi_i = \Phi(\text{Vec}(B_i))$, i=1, 2, . . . , k.

* * * * *